July 4, 1950 — C. E. GAGNIER ET AL — 2,513,305
PRESSUREPROOF ELECTRICAL SEPARABLE CONNECTION
Filed Sept. 15, 1945 — 2 Sheets-Sheet 1
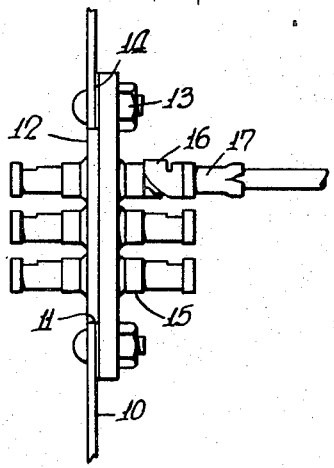
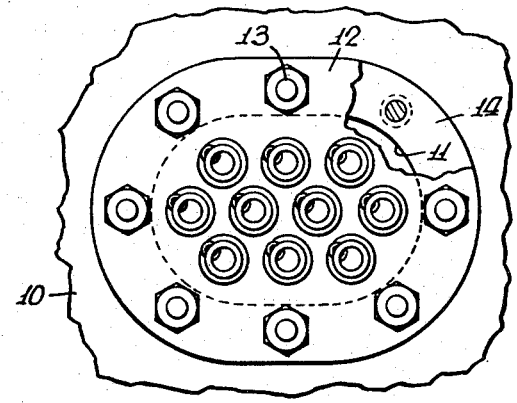
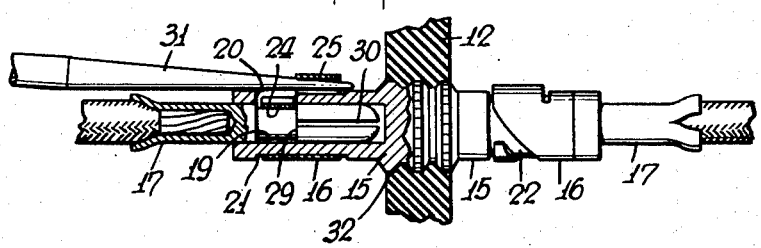
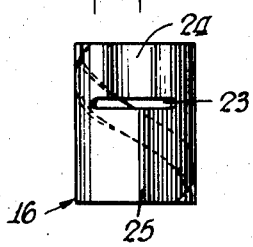
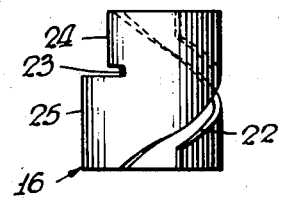
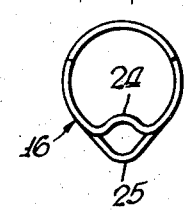
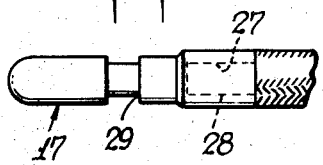
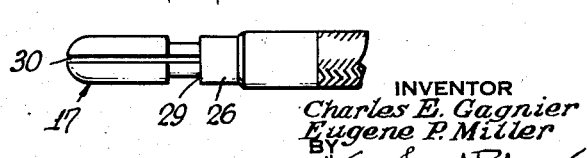
INVENTOR
Charles E. Gagnier
Eugene P. Miller
BY
ATTORNEY July 4, 1950 C. E. GAGNIER ET AL 2,513,305
PRESSUREPROOF ELECTRICAL SEPARABLE CONNECTION
Filed Sept. 15, 1945 2 Sheets-Sheet 2
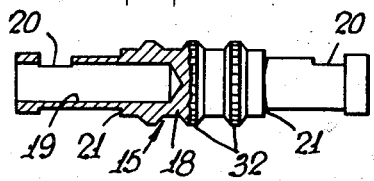
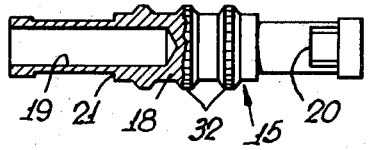
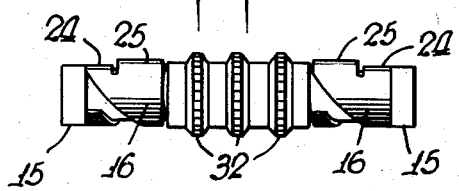
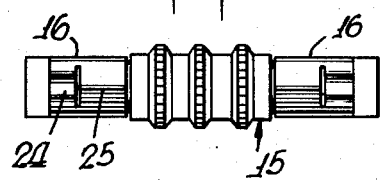
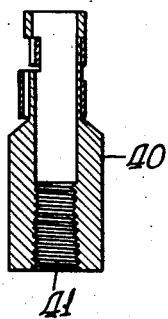
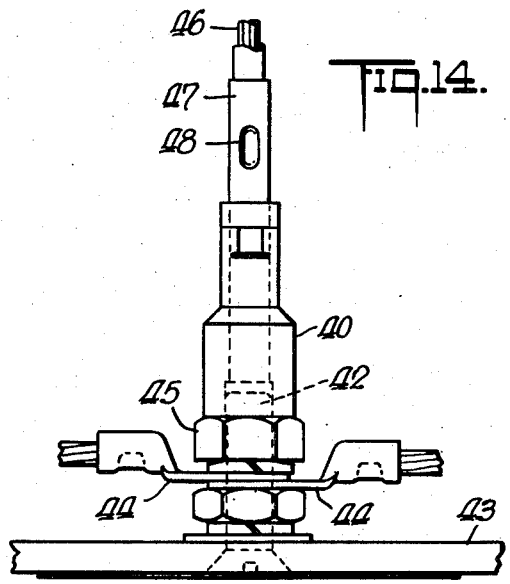
INVENTOR
Charles E. Gagnier
Eugene P. Miller
BY
Harry Ernest Rubens
ATTORNEY Patented July 4, 1950

2,513,305

UNITED STATES PATENT OFFICE 2,513,305

PRESSUREPROOF ELECTRICAL SEPARABLE CONNECTION

Charles E. Gagnier, Manhattan Beach, and Eugene P. Miller, Los Angeles, Calif.

Application September 15, 1945, Serial No. 616,576

5 Claims. (Cl. 173—328)

Our invention relates to air-tight electrical connections of the separable or quick-disconnect type.

In large military aircraft as well as in commercial airplanes, it has been found to be of advantage to provide closed "pressurized" cabins, wherein the crews of the airplanes may work in comfort even when the airplanes are flying in the rarified atmosphere of the stratosphere. In such cabins the air pressure is maintained at values approximately equal that of the atmosphere at about 10,000 feet altitude. When the aircraft are flying at higher altitudes, the difference in pressure within the cabins as compared with the outer air, causes the internal air to attempt to leak through any opening, no matter how small, into the outer air. It is therefore apparent that all connections from cabin to points outside the cabin must be closed so as to prevent this leakage.

In a military airplane with a pressurized cabin, large numbers of electrical connections must be made between the cabin and other parts of the airplane. Such connections may lead, for example, to electrical actuators of control surfaces; to electrical controls opening the bomb-bay doors; to electrical mechanisms operating the landing gear, etc. Several hundred wires may have to go from the cabin to other parts of the airplane and, where each wire passes through the bulkhead between pressurized and non-pressurized portions of the airplane, provision must be made to be sure that no air leakage can take place.

Accordingly the primary objects of our invention are to provide an electrical connection through a pressure sealed partition; to make such a connection separable without destroying the seal; to provide a pin and socket arrangement whereby a connection may be made quickly, and which will be securely locked in position unless intentionally separated.

Other objects are to provide means whereby the pin connection may be readily removed from its socket by the application of some simple tool; to provide a socket which may be molded in a plastic type of panel providing an electrical connection through the panel, to provide longitudinally located back to back sockets with a section of solid metal connecting the sockets whereby a "pressurized" connection may be made through a solid panel; to provide a panel assembly between two points of unequal pressure which panel assembly contains means for establishing electrical connections therethrough; to provide a panel assembly of the foregoing type which may be pressure sealed to an aperture in a bulkhead, and to provide a compact form of electrical socket for a panel whereby the maximum number of sockets may be positioned within a minimum area of panel.

We accomplish these and other objects and obtain our new results as will be apparent from the device described in the following specification, particularly pointed out in the claims, and illustrated in the accompanying drawing in which:

Fig. 1 is a side elevation of a bulkhead and panel assembly containing a plurality of electrical connections.

Fig. 2 is a front view of the same.

Fig. 3 is a longitudinally partially sectioned view of an electrical connection, through the panel indicating the method of unlocking the connection.

Figs. 4, 5, and 6 are front, side, and top views respectively, of sheet metal spring rolled to form a tube, forming a part of our invention.

Figs. 7 and 8 are front and top elevations of the pin jack connector.

Figs. 9 and 10 are front and top elevations of the socket connector, partly in section.

Figs. 11 and 12 are front and top elevations of the socket and spring assembly.

Fig. 13 is a longitudinally sectioned view of a combined socket and spring, for attachment to a post.

Fig. 14 is a side elevation of a panel post set of connections.

Referring more in detail to the drawings, reference numeral 10 designates the bulkhead of a plane, between different chambers of pressure; 11, the aperture therein for receiving the insulating panel 12, and 13 nut and bolts for locking the panel to the bulkhead over the sealing gasket 14.

An electrical connection through the panel is shown in Fig. 3. It comprises the socket unit 15, springs 16, and pin jacks 17.

Views of the socket unit are shown in Figs. 9 and 10. It consists of a metal rod portion 18, with a solid center into each end of which a longitudinally tubular recess 19 is formed. Slightly spaced from the open end of each recess, is an opening 20. On the outside of the socket, a circumferential groove 21 is formed which may have a width in excess of the width of the opening 20. The spring 16 is seated about the socket and in the groove 21. An illustration of the spring is shown in Figs. 4, 5, and 6. It preferably consists of a piece of sheet metal steel or beryllium copper, the two ends of which may be obliquely cut as at 22. A slot 23 is formed therein, and the spring is rolled into tubular form, with the slot transversely extending across the socket wall immediately adjacent the opening 20 of the socket. That portion of the spring longitudinally extending over the opening is depressed into the opening to form a pin engaging section 24. Spaced longitudinally therefrom and co-extensive therewith, but on the opposite side of the slot 23, the metal of the spring is raised to form a tool engaging section 25.

The pin jack 17 is shown in Figs. 7 and 8. It is made of solid rod 26 having a recess 27 at one end for the insertion of an exposed wire 28. A circumferential groove 29 is positioned between the end of the pin and the recess, in a manner, which will be hereinafter explained. The end of the pin is longitudinally split as at 30, to form a spring pressure against the inside wall of the tubular recesses 19 of the socket unit 15, when inserted therein. In so doing, the depressed section 24 of the spring falls into the groove 29 of the pin and locks the pin to the socket.

In order to separate the pin from the socket, a pointed tool 31 is inserted into the raised section 25 of the spring 16 to lift the depressed section 24 from the groove 29 of the pin, to unlock the pin and socket. The movement of the spring is facilitated by the split therein, due to its sheet metal construction.

The socket unit 15 is centrally provided with enlarged holding areas 32 to insure that the panel section 12 molded thereover will be securely attached thereto, sufficiently so to support the wires and connections.

In Fig. 14 a modified form of socket is illustrated for attachment to a post mounted to a panel. Here the socket member 40 is provided with a threaded recess 41 for engagement with the threaded post 42 which is secured to the panel 43 by some suitable method. By this arrangement, the post may be made sufficiently long so as to accommodate additional terminal lugs 44, and the socket member hexagonally shaped as at 45 to permit locking it to the post as if it were a nut. Thus the entire arrangement may be securely tightened to resist loosening.

Any suitable method of connecting the wire to the pin jack may be utilized, an example being illustrated in Fig. 14, where the wire 46 is crimped to the pin jack 47 by the indentation 48.

In the foregoing description we have outlined a socket-spring assembly cooperating with a split pin jack provided with a reduced neck, attached to a barrel section that accommodates an electrical conductor which pin jack may be locked to the socket by a releasable spring arrangement operable by a tool. By providing two such sockets back to back with connecting metal, a pressurized connection can be made, by molding the same into a plastic panel which, in turn, is fastened over a gasketed hole in a bulkhead. Thus electrical connections, separable at the bulkhead, can be made from one side of the bulkhead to the other, without permitting any air leakage from the cabin of the plane.

"Pressurized" connections of the foregoing construction may similarly be used in a variety of circumstances.

We have thus described our invention, but we desire it understood that it is not confined to the particular forms or uses shown and described, the same being merely illustrative, and that the invention may be carried out in other ways without departing from the spirit of our invention, and, therefore, we claim broadly the right to employ all equivalent instrumentalities coming within the scope of the appended claims, and by means of which, objects of our invention are attained and new results accomplished, as it is obvious that the particular embodiments herein shown and described are only some of the many that can be employed to attain these objects and accomplish these results.

We claim:

1. An electrical connection for attachment to a bulkhead having an aperture therein; comprising a rigid removable type of insulating panel board substantially covering said aperture, means to secure said panel to the bulkhead, a plurality of metallic connector post members rigidly supported by the panel and extending therethrough, said post members having a socket at one end, a plurality of individual pin jack members for electrical engagement with said sockets, and snap locking means mounted on said connector posts on the same side of the panel as the pin jacks, for engagement with the pin jack members to prevent longitudinal withdrawal when engaged, said snap locking means comprising a flat cylindrical shaped spring entirely encircling said post members, said spring having a depressed portion for engagement with the pin jack members.

2. An electrical connector comprising a metallic body having a tubularly shaped end portion and an aperture in the wall thereof, a cylindrically shaped pin jack for insertion into the tubular body and having a recessed portion at one end, a sheet metal cylindrically shaped spring encircling said body, said spring having a portion of its original surface depressed and extending through the aperture in the body wall to engage the recessed portion on the pin jack to secure the pin jack to the body.

3. The connector of claim 2, wherein the recessed portion on the pin jack has perpendicular side walls and the depressed portion of the spring has a sharp edge to engage the walls of the recessed portion.

4. An electrical connector comprising a metallic body having a tubularly shaped end and an aperture in the wall thereof, a tubular sheet metal spring encircling said body having a depressed portion and a raised portion, said depressed portion extending through the aperture and into the tubularly shaped end, said raised portion when outwardly moved causing said depressed portion to move in the same direction, a cylindrically shaped pin jack having a recessed portion thereon for insertion into the tubular body, said depressed portion of the spring engaging said pin jack through said body for securing the same together.

5. An electrical connector comprising a metallic body having a tubularly shaped end and an aperture in the wall thereof, a cylindrically shaped pin jack having a recessed portion thereon, for insertion into the tubular body, a sheet metal spring encircling said body, said spring comprising a tubular shaped section having a transverse slot therein, said tube having a raised portion on one side of said slot, and a depressed portion coextensive therewith on the other side of said slot, said depressed portion of the spring extending through the aperture in the body wall to engage the pin jack.

CHARLES E. GAGNIER.
EUGENE P. MILLER.

REFERENCES CITED

The following references are of record in the file of this patent:

UNITED STATES PATENTS

| Number | Name | Date |
|---|---|---|
| 367,670 | Scribner | Aug. 2, 1887 |
| 1,928,581 | Watts | Sept. 26, 1933 |
| 2,022,669 | Keefe | Dec. 3, 1935 |
| 2,265,341 | Borchert | Dec. 9, 1941 |
| 2,379,226 | Frey | June 26, 1945 |
| 2,431,999 | Engelhardt | Dec. 2, 1947 |

FOREIGN PATENTS

| Number | Country | Date |
|---|---|---|
| 418,999 | Great Britain | Nov. 5, 1934 |
| 735,641 | France | Sept. 6, 1932 |